Aug. 10, 1937.  A. GRAF  2,089,745
GRAVITY INSTRUMENT
Filed April 26, 1935
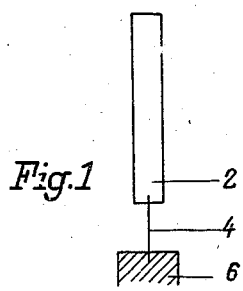
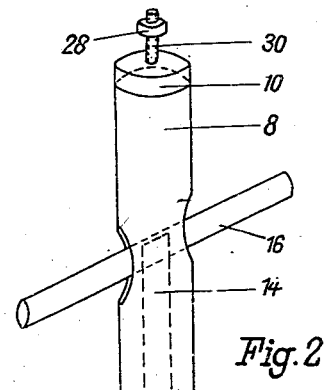
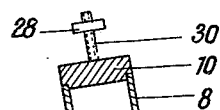
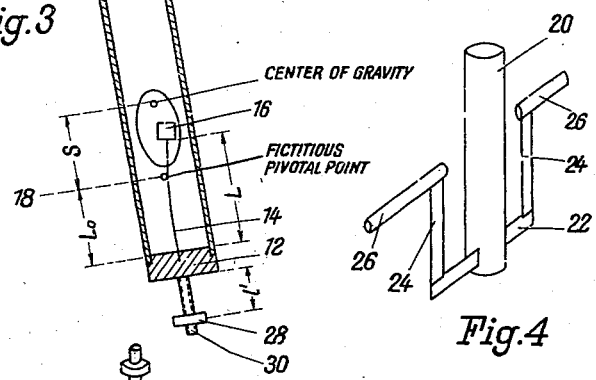
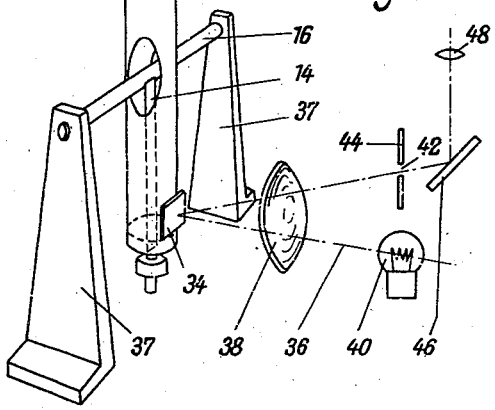
Inventor:
Anton Graf
by Edward H. Palmer
Atty.

Patented Aug. 10, 1937

2,089,745

UNITED STATES PATENT OFFICE 2,089,745

GRAVITY INSTRUMENT

Anton Graf, Berlin-Wilmersdorf, Germany

Application April 26, 1935, Serial No. 18,337
In Germany April 30, 1934

7 Claims. (Cl. 265—1.4)

This invention relates to resilient pendulum means, more particularly for measuring gravity.

The invention and its aims and objects will be clearly understood from the following description, taken in connection with the accompanying drawing of one embodiment of the invention herein given for illustrative purposes, the scope of the invention being more particularly pointed out in the appended claims.

In the drawing:

Fig. 1 shows diagrammatically the mode heretofore used in devices of this character for suspending the pendulum mass to the resilient means, the center of gravity being located above the fictitious fulcrum or pivotal point;

Fig. 2 shows diagrammatically in side elevation one illustrative embodiment of the invention;

Fig. 3 shows diagrammatically a longitudinal section of the embodiment of the invention shown in Fig. 2;

Fig. 4 shows diagrammatically a different arrangement of the suspension;

Fig. 5 illustrates diagrammatically the operation of the invention and manner of using the same.

Referring to Fig. 1, the pendulum mass 2 is shown secured to the upper end of a resilient member or spring 4, the lower end of the latter being secured to a fixed foundation 6. In this known construction it will be noted that the resilient member 4 is stressed by the weight of the pendulum mass 2.

Referring now more particularly to the illustrative embodiment of the invention shown in Figs. 2 and 3, it will be seen that the pendulum mass herein illustratively comprising a tubular member 8 and one or more weights, herein two weights 10 and 12, for example, is suspended from the lower end of resilient means herein comprising a spring 14. At its upper end said resilient means 14 is connected to a fixed supporting means, herein comprising illustratively a cross member or rod 16. In this construction, therefore, the resilient member or spring is stressed by the pendulum mass by tension only and not by compression, as is the case in the construction shown in Fig. 1. It will also be noted that the center of gravity of the pendulum mass, which in this embodiment of the invention may coincide with the geometrical center of the pendulum body, is also quite easily located above the fictitious fulcrum or pivotal point 18 of the resilient member 14.

By fictitious fulcrum in this case is meant, as usual, the point of intersection of all straight lines drawn from the point of attachment of the spring member to its pendulous mass, tangentially to all the possible curves the said spring member may assume responsive to oscillations of relatively small amplitude of said mass.

In the case of relatively short oscillations, the center of gravity of the pendulum mass moves with sufficient exactitude along the arc of a circle having as its center said fictitious fulcrum. Any resiliently suspended pendulum, whether its center of gravity be above or below said fictitious fulcrum, therefore operates in the case of relatively short oscillations as though the pendulum were oscillating about said fulcrum.

Fig. 4 shows a modification in which the pendulum mass 20 is supported below the center of gravity by supporting means such as a rod 22 for example suspended by two springs 24, 24 from fixed supports 26, 26.

Temperature changes may more injuriously affect the apparatus than elongations due to shocks or percussions. If the apparatus is to be used under conditions exposing it to considerable variations in temperature, it may be preferable, instead of making the distance of the center of gravity from the fictitious fulcrum equal to the fictitious length of the pendulum, so to choose the constants that the ratio of said two quantities shall be equal to $$\frac{\alpha L - \alpha p}{\alpha f + \alpha p}$$

wherein $\alpha L$ is the coefficient of linear elongation of said spring, $\alpha p$ that of the pendulum body and $\alpha f$ the temperature coefficient of the expression $$\frac{L}{EJ}$$

wherein L is the free length of the spring between its two points of attachment, E is the modulus of elasticity of said spring and J is the moment of inertia of the cross section of said spring relatively to the axis parallel to the fictitious pivotal axis or axes of oscillation.

As in practice it will generally be found difficult so to construct the pendulum that the value of the spacing of the center of gravity from the fictitious pivotal point shall be exactly equal to a predetermined value, it will generally be found preferable to make the position of the center of gravity, and possibly also the mass of the pendulum, adjustable. The present invention contemplates the use of any suitable means for this purpose. I have found that a weight or weights adjustably carried by said pendulum mass can conveniently be used for this purpose. In Figs. 2 and 3 two such adjustable weights 28, 28 are shown, said weights being adjustably carried by the pendulum mass, for example by screw threaded connection with pins 30, 30 at opposite ends of said pendulum mass. By suitable adjustment of said weight or weights, the position or location of the center of gravity relatively to the fictitious pivotal point, and thereby the distance of said center of gravity from said fictitious pivotal point, can be varied. By substituting lighter or heavier weights of the same weight ratio, the pendulum mass may also be varied, as will be readily understood. If the substituted weights be placed in the same relative position as those for which they are substituted, the position of the center of gravity relatively to the fictitious pivotal point will remain unchanged.

By making said pins 30 of suitable material having different coefficients of expansion, an automatic compensation for temperature variations will be obtained while preserving, for all practical purposes, uniformity of the distance of the center of gravity from the fictitious pivotal point as well as the fictitious length of pendulum.

The operation and manner of using my invention are diagrammatically illustrated in Fig. 5.

Referring to said figure the supporting rod 16 from which the pendulum 8 is suspended by the resilient means, such as a preferably flat spring 14, is fastened to two supporting standards 37, 37 which in turn may be secured to any suitable solid support or foundation, not shown. Said pendulum 8 carries a reflecting surface, mirror 34 for example, upon which is projected a beam of parallel rays 36 by means of a suitable lens 38 from a suitable source of light, such as an incandescent bulb 40 for example located in the focus of said lens.

When said pendulum occupies a certain predetermined position, said beam will be reflected by said reflecting surface 34 through a slit 42 provided in a diaphragm 44, said beam falling upon a second reflecting surface 46 which is so adjusted that it reflects said beam through a suitable lens 48 through which said slit can be observed by the operator. As said pendulum oscillates, said beam reflected from said mirror 34 passes back and forth across said slit 42, so that the observer of said slit through said lens 48 will note a flash every time said beam passes across said slit. The observer can thus count a suitable number of oscillations, say 100, of said pendulum, and by noting the time which elapses between the first and the last of said oscillations can determine with great accuracy the period of oscillation of said pendulum.

By suitably selecting the spring constant, that is to say the constant determined by the resilient force of the spring or the ratio between said constant and the mass of the pendulum, as well as the other factors controlling the oscillations, it is possible to obtain a very high degree of sensibility to gravity by locating the center of gravity above the fictitious fulcrum or pivotal point of the pendulum, as gravity can thus in great measure be compensated by the resilient force of the spring. Heretofore, however, in using such constructions, the pendulum mass has always been so secured to the spring that the said spring was stressed by pressure by the weight of the pendulum mass. In order to obtain a high degree of sensibility this necessitated making the pendulum mass so heavy that the spring was subjected to practically the maximum load by the pressure of the pendulum mass. As a result of this, such pendulum devices heretofore known were so sensitive to shocks and vibrations that they were practically deprived of all advantages which were supposed to be secured by locating the center of gravity above the fictitious fulcrum or pivotal point. Slight shocks or percussions are absolutely unavoidable in practice and even these, however slight, produce sudden desultory variations in the measurement results obtained, and such changes may be quite considerable and impossible to estimate.

The present invention eliminates all these objections while retaining all of the advantages of those devices in which the center of gravity is located above the fictitious fulcrum or pivotal point of the pendulum. One factor contributing to this result consists in securing the pendulum mass to the spring means in such manner that said spring or resilient means is stressed only by tension and not by compression. Other advantages consist in suitably determining the distance of the center of gravity of the pendulum mass relatively to the length of the resilient means or spring, by constructing the parts of materials having suitable coefficients of expansion and also by making provision for compensating variations due to temperature changes etc.

Apparatus embodying the present invention is particularly adapted for determining variations in gravity at certain points of a given region. Any variations in the spring constant as may occur in the course of a series of measurements, can be eliminated with sufficient accuracy for all practical purposes by repeating the measurement obtained at a certain point or points, the starting point, for example, of the series of measurements, during the making of said series. Any variations in the time or duration of oscillation which may occur in the course of the operation, are attributable to time changes in the spring constant and can be determined as to their functional dependence on temperature, time, etc. by application of the usual method and taken into account in the series of measurements obtained.

I am aware that the invention may be embodied in other specific forms than those herein disclosed without departing from the spirit or essential attributes of the invention, and I therefore desire the present embodiment to be considered in all respects as illustrative and not restrictive, reference being had to the appended claims rather than to the above description to indicate the scope of the invention.

I claim:

1. A device of the class described, more particularly for measuring gravity, comprising, in combination, a pendulum mass having its center of gravity above its fictitious pivotal point; supporting means; and resilient means for suspending said pendulum mass from said supporting means.

2. A device of the class described, more particularly for measuring gravity, comprising, in combination, a pendulum mass having its center of gravity above its fictitious pivotal point; supporting means; and resilient means connected to said supporting means and to said pendulum mass, the connection of said resilient means to said pendulum mass being below its connection to said supporting means, the construction and arrangement being such that said resilient means is stressed only by tension by said pendulum mass.

3. A device of the class described more particularly for measuring gravity, comprising, in combination, a pendulum having its center of gravity above its fictitious pivotal point; supporting means; and a resilient member for suspending said pendulum from said supporting means, the ratio of the distance of the center of gravity of said pendulum from its fictitious pivotal point being substantially equal to $$\frac{\alpha L - \alpha p}{\alpha f + \alpha p}$$

$\alpha L$ being the linear coefficient of expansion of said resilient member, $\alpha p$ the linear coefficient of expansion of said pendulum and $\alpha f$ the temperature coefficient of the expression $$\frac{L}{EJ}$$

wherein L is the free length of said resilient member between its points of connection to said supporting means and said pendulum respectively, E the modulus of resiliency of said resilient member and J the moment of inertia of the cross section of said resilient member relatively to an axis parallel to the fictitious axis of oscillation of said pendulum.

4. A device of the class described, more particularly for measuring gravity, comprising, in combination, a pendulum mass having its center of gravity above its fictitious pivotal point; supporting means; and resilient means for suspending said pendulum mass from said supporting means; and means for adjusting the distribution of the weight of the pendulum mass.

5. A device of the class described, more particularly for measuring gravity, comprising, in combination, a pendulum mass having its center of gravity above its fictitious pivotal point; supporting means; resilient means for suspending said pendulum mass from said supporting means; and weights mounted upon said pendulum mass at opposite sides of its center of gravity, said weights being relatively adjustable to vary the distribution of the weight and thus adjust the position of the center of gravity.

6. A device of the class described, more particularly for measuring gravity, comprising, in combination, a pendulum mass having its center of gravity above its fictitious pivotal point; supporting means; resilient means for suspending said pendulum mass from said supporting means; and means at opposite sides of the center of gravity of said pendulum mass for mounting weights of different weight to vary the pendulum mass.

7. A device of the class described, more particularly for measuring gravity, comprising, in combination, a pendulum mass having its center of gravity above ts fictitious pivotal point; supporting means; resilient means for suspending said pendulum mass from said supporting means; and rods having a different coefficient of expansion carried by said pendulum mass at opposite sides of its center of gravity; and weights adjustable longitudinally of said rods.

ANTON GRAF.